(12) United States Patent
Oi et al.

(10) Patent No.: US 11,934,059 B2
(45) Date of Patent: Mar. 19, 2024

(54) LIQUID CRYSTAL MEMBER AND MILLIMETER-WAVE MODULATION ELEMENT

(71) Applicant: FUJIFILM Corporation, Tokyo (JP)

(72) Inventors: Yuki Oi, Kanagawa (JP); Takao Taguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/307,646

(22) Filed: Apr. 26, 2023

(65) Prior Publication Data

US 2023/0288744 A1    Sep. 14, 2023

Related U.S. Application Data

(63) Continuation of application No. PCT/JP2021/037100, filed on Oct. 7, 2021.

(30) Foreign Application Priority Data

Oct. 29, 2020 (JP) ................................. 2020-181538

(51) Int. Cl.
G02F 1/1333 (2006.01)

(52) U.S. Cl.
CPC .. G02F 1/133368 (2021.01); G02F 1/133371 (2013.01)

(58) Field of Classification Search
CPC ..................... G02F 1/133368; G02F 1/133371
See application file for complete search history.

(56) References Cited

U.S. PATENT DOCUMENTS

2010/0073604 A1    3/2010  Okuyama et al.
2010/0260030 A1   10/2010  Tao et al.
(Continued)

FOREIGN PATENT DOCUMENTS

JP    2006-261088 A    9/2006
JP    2007-249027 A    9/2007
JP    2010-152296 A    7/2010
(Continued)

OTHER PUBLICATIONS

JP 2007249027 A machine translation (Year: 2007).*
(Continued)

Primary Examiner — James A Dudek
(74) Attorney, Agent, or Firm — Edwards Neils LLC; Jean C. Edwards, Esq.

(57) ABSTRACT

Provided are a liquid crystal member and a millimeter-wave modulation element with the liquid crystal member including a liquid crystal layer having a non-flat surface. The liquid crystal member includes a liquid crystal layer in which a liquid crystal composition which contains a liquid crystal compound having a polymerizable group and a polymerization initiator is immobilized in an aligned state, with at least one main surface of two main surfaces of the liquid crystal layer at both ends in a thickness direction is a non-flat surface having various shapes in a region on the non-flat surface side of one of the two main surfaces, a slow axis of the liquid crystal compound has an equal angle with respect to an adjacent non-flat surface, and in a region on the other main surface side, slow axes of the liquid crystal compound are parallel to each other.

20 Claims, 10 Drawing Sheets

(56) References Cited

U.S. PATENT DOCUMENTS

2014/0085597 A1    3/2014    Katou et al.
2018/0246354 A1    8/2018    Popovich et al.

FOREIGN PATENT DOCUMENTS

WO    2009/084604 A1    7/2009
WO    2012/157726 A1    11/2012

OTHER PUBLICATIONS

International Search Report issued in PCT/JP2021/037100 dated Dec. 14, 2021.
Written Opinion issued in PCT/JP2021/037100 dated Dec. 14, 2021.
International Preliminary Report on Patentability completed by WIPO dated May 2, 2023 in connection with International Patent Application No. PCT/JP2021/037100.

* cited by examiner

○ VISUAL FIELD (1 μm)
↔ SLOW AXIS DIRECTION

○ VISUAL FIELD (1 μm)
↔ SLOW AXIS DIRECTION
θ EXTINCTION ANGLE

LIQUID CRYSTAL MEMBER AND MILLIMETER-WAVE MODULATION ELEMENT

CROSS-REFERENCE TO RELATED APPLICATIONS

This application is a Continuation of PCT International Application No. PCT/JP2021/037100 filed on Oct. 7, 2021, which was published under PCT Article 21(2) in Japanese, and which claims priority under 35 U.S.C. § 119(a) to Japanese Patent Application No. 2020-181538 filed on Oct. 29, 2020. The above applications are hereby expressly incorporated by reference, in its their entirety, into the present application.

BACKGROUND OF THE INVENTION

1. Field of the Invention

The present invention relates to a liquid crystal member and a millimeter-wave modulation element.

2. Description of the Related Art

An element which includes a liquid crystal layer formed of a liquid crystal composition containing a liquid crystal compound has been used as a retardation plate utilizing refractivity anisotropy of the liquid crystal compound, an optical element for controlling an angle of light, and the like. In the related art, the optical element including such a liquid crystal layer has a flat surface, and has been used for control of visible light, such as a display for television, smartphone, and tablet PC.

The optical element including such a liquid crystal layer is expected to be used as an element for controlling incidence ray and emitted light to various optical sensors. In general, a surface of the optical sensor may not be flat. In addition, the optical sensor may be used in combination with an optical component having a non-flat surface, such as a single focus lens, a Fresnel lens, a light guide plate, and a prism. Therefore, in a case where the optical element having a liquid crystal layer is combined in the optical sensor, the surface of the liquid crystal layer is made uneven according to the surface shape of the optical sensor or the surface shape of the various optical components described above. As a result, it is conceivable to suppress unintended refraction, reflection, scattering, and the like due to formation of voids.

For example, JP2006-261088A discloses a light guide including a first optical part that consists of a transparent material and has unevenness of a predetermined shape formed on at least one main surface, and a second optical part that contains a refractivity anisotropic material and is formed on the unevenness of the first optical part, in which one refractive index of the refractivity anisotropic material is substantially the same as a refractive index of the first optical part, and a unit for aligning the refractivity anisotropic material (liquid crystal material) in a predetermined direction is applied to the main surface on which the unevenness of the first optical part is formed.

SUMMARY OF THE INVENTION

An alignment angle of a liquid crystal compound in a region in the vicinity of an interface (both main surfaces) of a liquid crystal layer is affected by an interaction between the liquid crystal layer and an adjacent part. Therefore, in a case of a liquid crystal layer having a concave-convex shape, in a region in the vicinity of a side of a main surface having a concave-convex shape (a non-flat surface), due to the concave-convex shape, a slow axis of the liquid crystal compound is aligned in a different direction depending on the position in the plane direction. For example, the liquid crystal compound is aligned along the concave-convex shape. In addition, the alignment state of the liquid crystal compound is affected by an interaction between adjacent liquid crystal compounds. Therefore, the influence of the alignment angle of the liquid crystal compound in the region in the vicinity of the non-flat surface also affects the alignment angle of the liquid crystal compound present at a position distant from the non-flat surface, and the alignment angle of the liquid crystal compound gradually changes from the non-flat surface to the opposite main surface. That is, the alignment of the liquid crystal compound in the liquid crystal layer is non-uniform. As a result, there is a problem that desired optical characteristics of the liquid crystal layer cannot be obtained.

An object of the present invention is to provide a liquid crystal member and a millimeter-wave modulation element that can obtain desired optical characteristics in a liquid crystal member including a liquid crystal layer having a non-flat surface.

In order to solve the problems, the present invention has the following configuration.

[1] A liquid crystal member comprising:
a liquid crystal layer in which a liquid crystal compound having a polymerizable group is immobilized in an aligned state,
in which the liquid crystal compound has magnetic susceptibility anisotropy,
at least one main surface of two main surfaces of the liquid crystal layer at both ends in a thickness direction is a non-flat surface having any of a concave shape, a convex shape, or a concave-convex shape,
in a region on the non-flat surface side of one of the two main surfaces, a slow axis of the liquid crystal compound has an equal angle with respect to an adjacent non-flat surface, and
in a region on the other main surface side, slow axes of the liquid crystal compound are parallel to each other.

[2] The liquid crystal member according to [1], in which a magnetic susceptibility anisotropy $\Delta X$ of the liquid crystal compound is $|\Delta X| \geq 1 \times 10^{-8}$.

[3] The liquid crystal member according to [1] or [2], in which a thickness of the liquid crystal layer is 10 μm or more.

[4] The liquid crystal member according to any one of [1] to [3],
in which the non-flat surface has an optical axis, and
in a case where a plane perpendicular to the optical axis is defined as a reference plane, the slow axis of the liquid crystal compound present in the region on the other main surface side is parallel to the reference plane.

[5] The liquid crystal member according to any one of [1] to [4],
in which the non-flat surface has a lens shape.

[6] The liquid crystal member according to any one of [1] to [3], further comprising:
an optical member which is disposed on one main surface side of the liquid crystal layer and has an optical axis,
in which, in a case where a plane perpendicular to the optical axis of the optical member is defined as a reference plane, the slow axis of the liquid crystal compound present in the region on the other main surface side is parallel to the reference plane.

[7] The liquid crystal member according to [6], in which the optical member is a light source.

[8] The liquid crystal member according to any one of [1] to [3], in which the other main surface is a flat surface, and in a case where the other main surface which is the flat surface is defined as a reference plane, the slow axis of the liquid crystal compound present in the region on the other main surface side is parallel to the reference plane.

[9] A millimeter-wave modulation element comprising:
the liquid crystal member according to any one of [1] to [8].

According to the present invention, it is possible to provide a liquid crystal member and a millimeter-wave modulation element that can obtain desired optical characteristics in a liquid crystal member including a liquid crystal layer having a concave-convex surface.

DESCRIPTION OF THE PREFERRED EMBODIMENTS

Hereinafter, the liquid crystal member according to the embodiment of the present invention will be described in detail with reference to suitable examples shown in the accompanying drawings.

In the present specification, a numerical range represented by "to" means a range including numerical values before and after "to" as a lower limit value and an upper limit value.

In the present specification, "(meth)acrylate" is used to mean "either or both of acrylate and methacrylate".

In the present specification, "same", "equal", and the like include an error range generally accepted in the technical field.

[Liquid Crystal Member]

The liquid crystal member according to the embodiment of the present invention is a liquid crystal member including a liquid crystal layer in which a liquid crystal composition which contains a liquid crystal compound having a polymerizable group and a polymerization initiator is immobilized in an aligned state, in which the liquid crystal compound has magnetic susceptibility anisotropy, at least one main surface of two main surfaces of the liquid crystal layer at both ends in a thickness direction is a non-flat surface having any of a concave shape, a convex shape, or a concave-convex shape, in a region on the non-flat surface side of one of the two main surfaces, a slow axis of the liquid crystal compound has an equal angle with respect to an adjacent non-flat surface, and in a region on the other main surface side, slow axes of the liquid crystal compound are parallel to each other.

Figure 1:
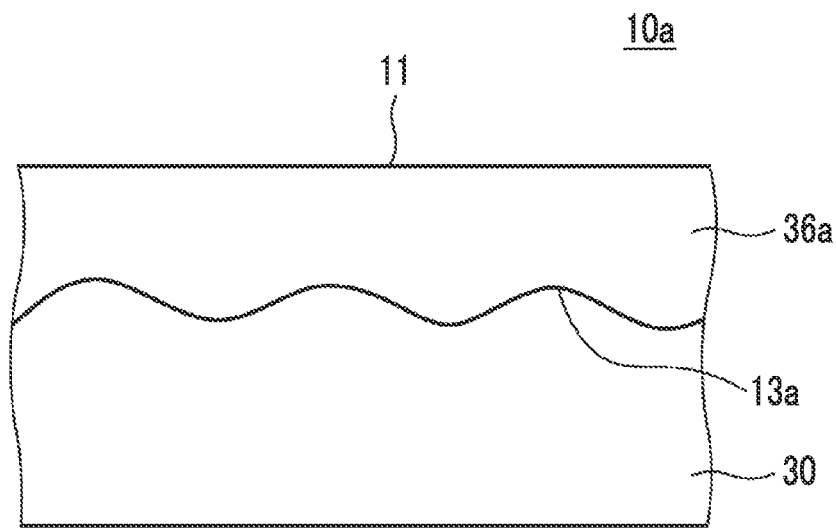
FIG. 1 is a diagram conceptually showing an example of the liquid crystal member according to the embodiment of the present invention.

FIG. 1 conceptually shows an example of the liquid crystal member according to the embodiment of the present invention.

A liquid crystal member 10a shown in FIG. 1 has a support 30 and a liquid crystal layer 36a laminated on one main surface of the support 30. The main surface is the maximum surface of a film-like material (sheet-like material).

In the example shown in FIG. 1, a surface of the support 30 on the liquid crystal layer 36a side has a curved concave-convex shape, and a second main surface 13a of the liquid crystal layer 36a, in contact with the surface having a concave-convex shape, has a curved concave-convex shape. The second main surface 13a having a concave-convex shape is a non-flat surface in the present invention. On the other hand, a first main surface 11 of the liquid crystal layer 36a on the side opposite to the support 30 is a flat surface.

The liquid crystal layer 36a is a liquid crystal layer formed (cured) by polymerizing a liquid crystal composition which contains a liquid crystal compound having a polymerizable group and a polymerization initiator in an aligned state, and has a configuration in which the liquid crystal compound is immobilized in an aligned state.

Figure 2:
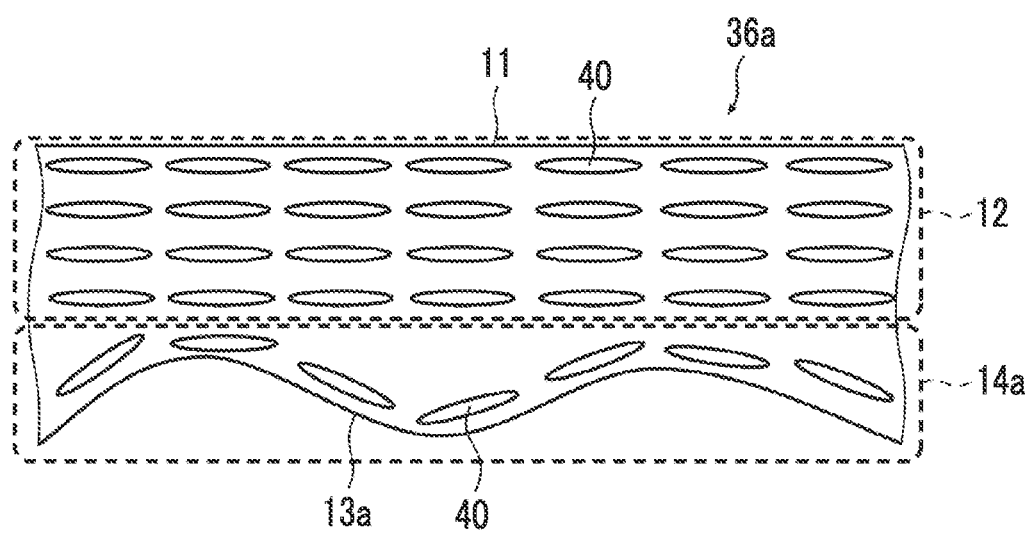
FIG. 2 is a diagram conceptually showing a liquid crystal layer included in the liquid crystal member shown in FIG. 1.

FIG. 2 is a diagram conceptually showing the liquid crystal layer 36a included in the liquid crystal member 10a shown in FIG. 1.

In the example shown in FIG. 2, the liquid crystal compound 40 is a rod-like liquid crystal compound. In a first region 12 of the liquid crystal layer 36a on the first main surface 11 side, a direction of a slow axis of the liquid crystal compound 40 is parallel to the first main surface 11 which is a flat surface, and is parallel to a left-right direction in the figure. That is, slow axes of the liquid crystal compound 40 present in the first region 12 on the first main surface 11 side are parallel to each other, the first region 12 being surrounded by a broken line in FIG. 2.

The example shown in FIG. 2 is an example in which, in a case where the first main surface 11 which is a flat surface is defined as a reference plane, the slow axis of the liquid crystal compound 40 present in the first region 12 is parallel to the reference plane.

In the liquid crystal compound, the slow axis is an axis at which a refractive index is highest. In the rod-like liquid crystal compound, the slow axis is along a major axis direction of the rod shape.

On the other hand, in a second region 14a of the liquid crystal layer 36a on the second main surface 13a side, in a case where an angle of the slow axis of each liquid crystal compound 40 with respect to the second main surface 13a which is a non-flat surface is defined as an alignment angle, the alignment angles of the liquid crystal compound 40 are equal to each other. Here, the angle (alignment angle) of the slow axis of the liquid crystal compound 40 with respect to the second main surface 13a (non-flat surface) is an angle of each liquid crystal compound 40 with respect to an adjacent non-flat surface. Specifically, in a case where a line segment is drawn from a center position of the liquid crystal compound 40 in a direction perpendicular to a reference plane described later, and a tangent of the line segment at a point of intersection with the non-flat surface is defined as a reference line, an angle of the slow axis with respect to the reference line is the alignment angle of the liquid crystal compound 40. For example, in a case of a rod-like liquid crystal compound as in the shown example, a line segment is drawn from the center position of a major axis direction in a direction perpendicular to the first main surface 11 which is the reference plane, and a tangent of the line segment at a point of intersection with the second main surface 13a is a reference line.

In the example shown in FIG. 2, the alignment angles of the liquid crystal compounds 40 present in the second region 14a are 0°, respectively. That is, the liquid crystal compounds 40 present in the second region 14a are arranged so that the direction of the slow axis follows the concave-convex shape of the second main surface 13a which is a non-flat surface.

In the present invention, the fact that the slow axes of the liquid crystal compound 40 are "parallel", "equal", and the like means a strict angle range of ±1°.

As described above, in the present invention, the liquid crystal layer 36a consists of two regions of the first region 12 in which the slow axes of the liquid crystal compound 40 are arranged parallel to each other and the second region 14a in which the alignment angles with respect to the non-flat surface are equal to each other. That is, the liquid crystal layer 36a does not have a region in which the alignment angle of the liquid crystal compound gradually changes between the non-flat surface and the main surface on the opposite side.

As will be described in detail later, in the present invention, the liquid crystal compound 40 has magnetic susceptibility anisotropy, and the liquid crystal compound 40 is aligned using a magnetic field. In addition, the liquid crystal compound 40 in the region on the non-flat surface side is aligned using an alignment film. As a result, it is possible to form a liquid crystal layer having the first region 12 in which the slow axes of the liquid crystal compound 40 are arranged parallel to each other and the second region 14a in which the alignment angles with respect to the non-flat surface are equal to each other.

As described above, in a case where the liquid crystal member including a liquid crystal layer is used in combination with an optical sensor having an uneven surface or with an optical component having a non-flat surface, such as a single focus lens, a Fresnel lens, a light guide plate, and a prism, it is considered that a main surface of the liquid crystal layer is made into a non-flat surface accordance to the surface shape of the optical sensor or the surface shape of the various optical components described above, thereby reducing overall thickness.

However, an alignment angle of a liquid crystal compound in a region in the vicinity of an interface (both main surfaces) of a liquid crystal layer is affected by an interaction between the liquid crystal layer and an adjacent part. In addition, the alignment state of the liquid crystal compound is affected by an interaction between adjacent liquid crystal compounds. Therefore, in a case of a liquid crystal layer having a concave-convex shape, in a region in the vicinity of the non-flat surface having a concave-convex shape, for example, the liquid crystal compound is aligned along the concave-convex shape due to an influence of the concave-convex shape. The influence of the alignment angle of the liquid crystal compound in the region in the vicinity of the non-flat surface also affects the alignment angle of the liquid crystal compound present at a position distant from the non-flat surface, and the alignment angle of the liquid crystal compound gradually changes from the non-flat surface to the opposite main surface. As a result, there is a problem that desired optical characteristics of the liquid crystal layer cannot be obtained.

On the other hand, the liquid crystal member according to the embodiment of the present invention has a configuration in which at least one main surface of the liquid crystal layer is a non-flat surface, the alignments of the liquid crystal compound are parallel to each other in the first region 12 on the first main surface 11 side, and the angles of the slow axis of the liquid crystal compound with respect to the non-flat surface are equal to each other in the second region 14a on the second main surface 13a side, which is a non-flat surface. With such a configuration, in the liquid crystal member including a liquid crystal layer having a non-flat surface, desired optical characteristics due to the alignment of the liquid crystal compound can be appropriately obtained.

Here, in the present invention, the non-flat surface is a surface having any of a concave shape, a convex shape, or a concave-convex shape. The concave shape, the convex shape, and the concave-convex shape may be a curved surface, or may be a combination of planes having different tilt angles. In addition, it is preferable that the non-flat surface includes at least a surface tilted with respect to a reference plane described later, that is, a plane (including a curved plane) other than a plane horizontal or perpendicular to the reference plane. Specific examples of the non-flat surface will be described in detail later.

In addition, the fact that the liquid crystal compound has magnetic susceptibility anisotropy means that magnetic susceptibility varies depending on the direction. The magnetization susceptibility is a physical property value indicating susceptibility to magnetization of a substance. In the present invention, the "having magnetic susceptibility anisotropy" means that the absolute value of a magnetic susceptibility anisotropy $\Delta X$ measured as follows is $1 \times 10^{-8}$ or more.

A method for measuring the magnetic susceptibility anisotropy is as follows.

First, a sample obtained by pre-aligning a liquid crystal composition containing the liquid crystal compound with an alignment film and curing the liquid crystal composition is prepared. With the sample, a superconducting quantum interference device (SQUID) is used to measure magnetic moment generated in response to an external magnetic field in two dispositions of (1) the external magnetic field and the slow axis are disposed in parallel and (2) the external magnetic field and the slow axis are disposed perpendicularly, and a value obtained by dividing the magnetic moment by a volume of the sample is calculated. An absolute value of a difference between the value measured in the disposition (1) and the value measured in the disposition (2) is determined as the magnetic susceptibility anisotropy $|\Delta X|$.

From the viewpoint of set the alignment of the liquid crystal compound in the first region 12 on the first main surface 11 side and the alignment of the liquid crystal compound in the second region 14a on the second main surface 13a side, which is a non-flat surface, to be parallel, the magnetic susceptibility anisotropy $|\Delta X|$ is preferably $1 \times 10^{-8}$ or more, more preferably $10^{-7}$ or more and $10^{-4}$ or less, and still more preferably $10^{-5}$ or more and $10^{-4}$ or less.

In addition, an angle (alignment angle) of the slow axis of the liquid crystal compound is measured as follows.

A polarizer and an analyzer are disposed in a crossed nicols, and the liquid crystal layer is sandwiched therebetween. Thereafter, the alignment state of the liquid crystal layer is observed with a polarization microscope, and an in-plane angle of the slow axis of the liquid crystal layer is determined. Subsequently, a piece of a cross section of the liquid crystal layer is taken along the angle of slow axis and placed on a stage, and the magnification is set so that the visual field range is approximately 50 µm. The piece is observed while being rotated, and with regard to a position of 1 µm from the first main surface, a position of 1 µm from the second main surface, and a total of 10 points observed by equally dividing the two points into 9 equal intervals, it is determined as an angle with respect to a reference plane described later. An extinction angle is determined by this way, but since there are two possibilities that the angle of slow axis is parallel or perpendicular to the extinction angle, a sensitive color plate (530 nm wavelength plate) is inserted into the microscope, and the angle of slow axis is determined from a relationship between the slow axis of the wavelength plate and the tint.

Such measurement is performed 10 times at 5 µm intervals in a plane direction of the reference plane.

A region in which a point, that the angles of the slow axes at a position 1 µm from the first main surface coincide with each other in the plane direction and the slow axes are parallel to the slow axis at a position 1 µm from the first main surface, is continuous from the first main surface is determined as the first region.

Next, at a position 1 µm from the second main surface and a point not determined to be the first region, the angle (alignment angle) of the slow axis at each point with respect to the non-flat surface is read at each position in the plane direction, and a case where the alignment angles are equal to each other is determined as the second region.

A case where the liquid crystal layer consists of the first region and the second region, which are determined in this manner, is determined to be the liquid crystal layer of the present invention.

A thickness of the second region is preferably 1 µm to 10 mm, more preferably 10 µm to 1 mm, and still more preferably 100 µm to 500 µm. In addition, a portion excluding the second region is a thickness of the first region.

Here, the example shown in FIG. 2 has a configuration in which the direction of the slow axis of the liquid crystal compound in the first region 12 is parallel to the first main surface 11 which is a flat surface, but the present invention is not limited thereto.

Figure 3:
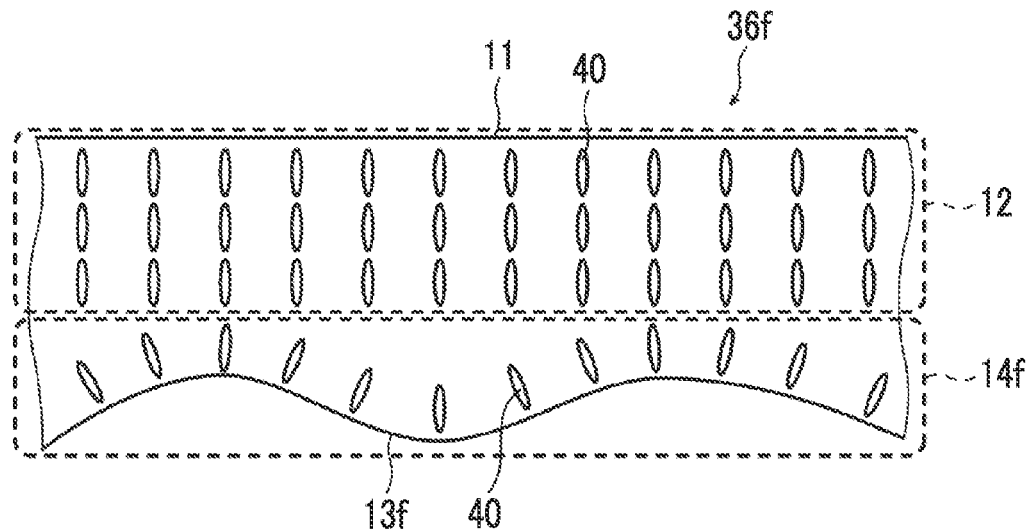
FIG. 3 is a diagram conceptually showing another example of the liquid crystal layer.

For example, as in a liquid crystal layer 36f shown in FIG. 3, directions of slow axes of the liquid crystal compound 40 in the first region 12 on the first main surface 11 side may be perpendicular to the first main surface 11 which is a flat surface, and may be parallel to each other. In addition, in the liquid crystal layer 36f as shown in FIG. 3, the liquid crystal compound 40 present in a second region 14f on a second main surface 13f side has an angle (alignment angle) of the slow axes of 90° with respect to the adjacent non-flat surface.

Figure 4:
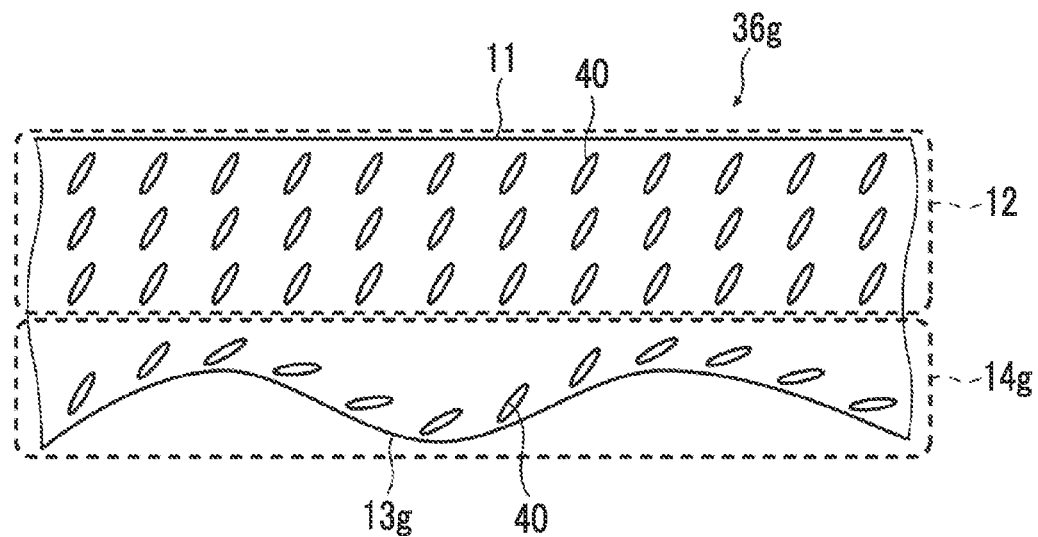
FIG. 4 is a diagram conceptually showing another example of the liquid crystal layer.

In addition, as in a liquid crystal layer 36g shown in FIG. 4, directions of slow axes of the liquid crystal compound 40 in the first region 12 on the first main surface 11 side may be tilted at a predetermined angle with respect to the first main surface 11 which is a reference plane, and may be parallel to each other. In addition, in the liquid crystal layer 36g as shown in FIG. 4, the liquid crystal compound 40 present in a second region 14g on a second main surface 13g side is arranged so that the angle (alignment angle) of the slow axis with respect to the adjacent non-flat surface is a predetermined angle.

Next, a shape of the liquid crystal layer included in the liquid crystal member according to the embodiment of the present invention (shape of the non-flat surface) will be described with reference to FIGS. 5 to 10.

Figure 5:
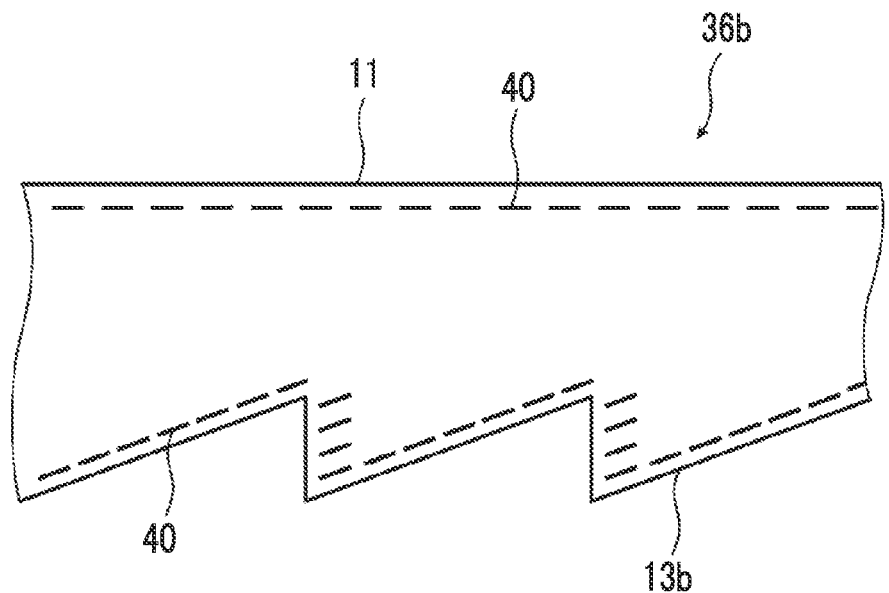
FIG. 5 is a diagram conceptually showing another example of the liquid crystal layer.
Figure 6:
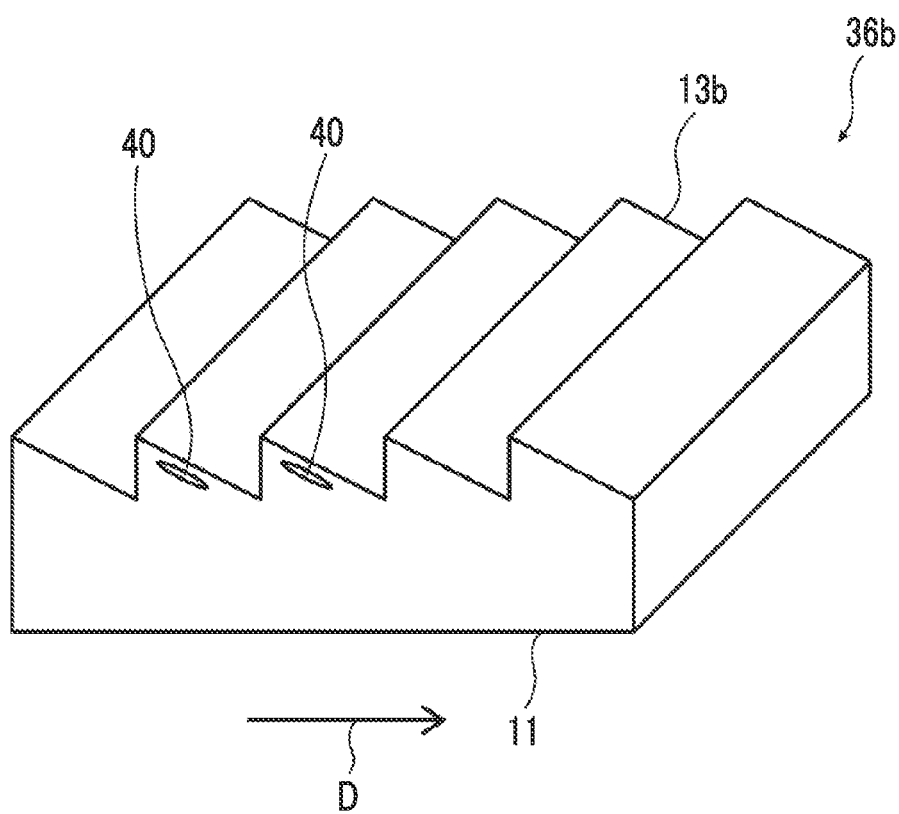
FIG. 6 is a perspective view of the liquid crystal layer shown in FIG. 5.

FIG. 5 is a diagram conceptually showing another example of the liquid crystal layer. FIG. 6 shows a perspective view of FIG. 5.

In a liquid crystal layer 36b shown in FIGS. 5 and 6, the first main surface 11 is a flat surface, and a second main surface 13b is a non-flat surface in which rows of microprisms having right-angled triangular cross sections are formed in a direction indicated by an arrow D in the figure. The second main surface 13b can have a concave-convex shape in which a plane perpendicular to the first main surface 11 and a plane tilted at an angle different from the plane perpendicular to the first main surface 11 are alternately combined.

Even in the liquid crystal layer 36b having the non-flat surface with such a shape, the liquid crystal compounds 40 present in the second region on the second main surface 13b side have the equal angle (alignment angle) of the slow axes with respect to the non-flat surface. In the shown example, the alignment angle is 0°. On the other hand, the slow axes of the liquid crystal compound 40 present in the first region on the first main surface 11 side are parallel to the first main surface 11 and parallel to each other. In FIG. 5, only the liquid crystal compounds 40 present in the vicinity of the first main surface 11 and the vicinity of the second main surface 13b are conceptually illustrated. The same applies to FIG. 7, FIG. 9, and FIG. 11 below.

In the example shown in FIGS. 5 and 6, the non-flat surface of the liquid crystal layer has a concave-convex shape in which a plane perpendicular to the first main surface 11 and a plane tilted at an angle different from the plane perpendicular to the first main surface 11 are alternately combined, but the present invention is limited thereto.

Figure 7:
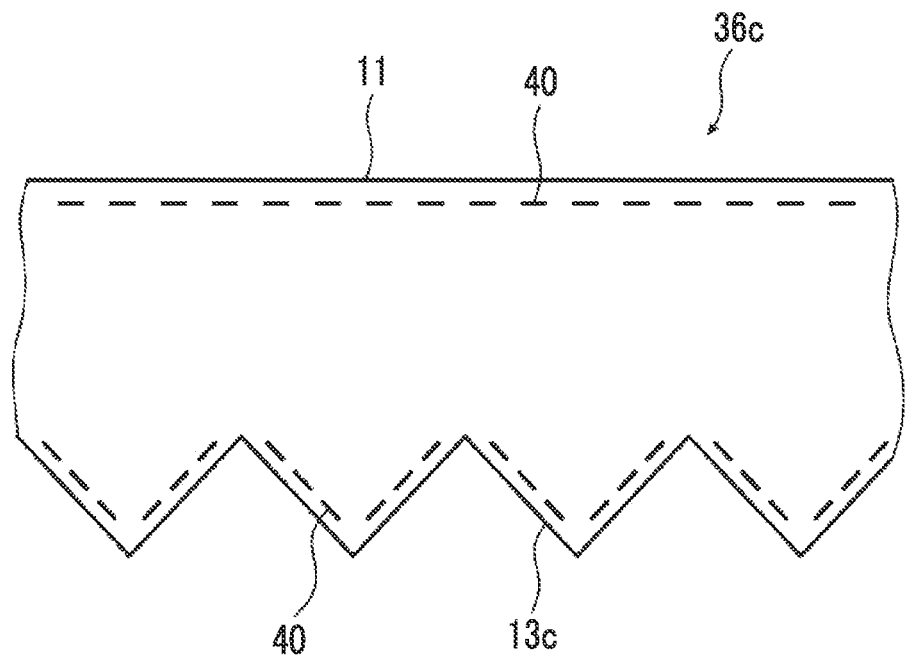
FIG. 7 is a diagram conceptually showing another example of the liquid crystal layer.

In a liquid crystal layer 36c shown in FIG. 7, the first main surface 11 is a flat surface, and a second main surface 13c is a non-flat surface in which rows of microprisms having isosceles triangular cross sections are formed. The second main surface 13c can have a concave-convex shape in which a plane tilted with respect to the first main surface 11 and a plane tilted at an angle different from the plane perpendicular to the first main surface 11 are alternately combined.

Even in the liquid crystal layer 36c having the non-flat surface with such a shape, the liquid crystal compounds 40 present in the second region on the second main surface 13c side have the equal angle (alignment angle) of the slow axes with respect to the non-flat surface. In the shown example, the alignment angle is 0°. On the other hand, the slow axes of the liquid crystal compound 40 present in the first region on the first main surface 11 side are parallel to the first main surface 11 and parallel to each other.

Figure 8:
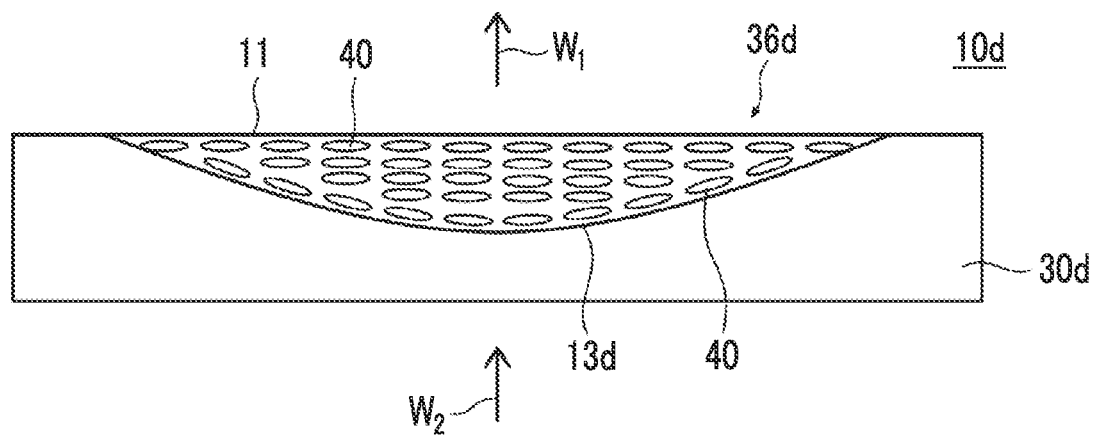
FIG. 8 is a diagram conceptually showing another example of the liquid crystal member.

FIG. 8 is a diagram conceptually showing another example of the liquid crystal member.

A liquid crystal member 10d shown in FIG. 8 has a support 30d and a liquid crystal layer 36d.

The support 30d has a substantially spherical crown-shaped concave portion on one main surface. That is, it can be said that the support 30d has a concave lens shape.

In the concave portion of the support 30d, the liquid crystal layer 36d is formed so that a surface of the support 30d and a surface of the liquid crystal layer 36d are substantially co-planar. Therefore, the first main surface 11 of the liquid crystal layer 36d on a side opposite to the support 30d is a flat surface, and a second main surface 13d of the liquid crystal layer 36d on the support 30d side is a convex non-flat surface. That is, it can be said that the liquid crystal layer 36d has a convex lens shape.

Even in the liquid crystal layer 36d having the non-flat surface with such a shape, the liquid crystal compounds 40 present in the second region on the second main surface 13d side have the equal angle (alignment angle) of the slow axes with respect to the non-flat surface. In the shown example, the alignment angle is 0°. On the other hand, the slow axes of the liquid crystal compound 40 present in the first region on the first main surface 11 side are parallel to the first main surface 11 and parallel to each other.

Figure 9:
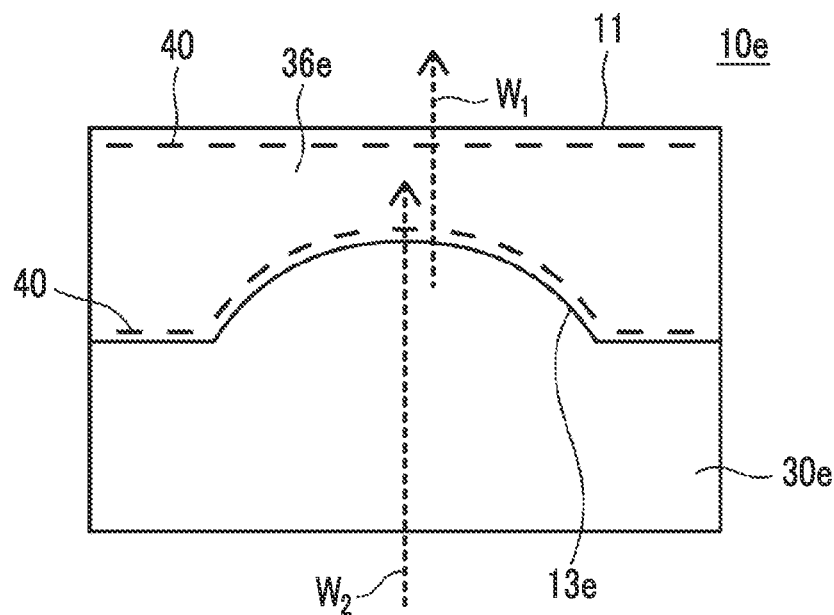
FIG. 9 is a diagram conceptually showing another example of the liquid crystal member.

FIG. 9 is a diagram conceptually showing another example of the liquid crystal member.

A liquid crystal member 10e shown in FIG. 9 has a support 30e and a liquid crystal layer 36e.

The support 30e has a substantially spherical crown-shaped concave portion on one main surface. That is, it can be said that the support 30e has a convex lens shape.

The liquid crystal layer 36e is formed on a main surface of the support 30e on a side having a convex portion. The first main surface 11 of the liquid crystal layer 36e on a side opposite to the support 30e is a flat surface, and a second main surface 13e of the liquid crystal layer 36e on the support 30e side is a concave non-flat surface. That is, it can be said that the liquid crystal layer 36e has a concave lens shape.

Even in the liquid crystal layer 36e having the non-flat surface with such a shape, the liquid crystal compounds 40 present in the second region on the second main surface 13e side have the equal angle (alignment angle) of the slow axes with respect to the non-flat surface. In the shown example, the alignment angle is 0°. On the other hand, the slow axes of the liquid crystal compound 40 present in the first region on the first main surface 11 side are parallel to the first main surface 11 and parallel to each other.

Here, the examples shown in FIGS. 1 to 9 has a configuration in which one main surface of the liquid crystal layer is a flat surface and the other main surface is a non-flat surface, but the present invention is not limited thereof, and both main surfaces of the liquid crystal layer may be non-flat surfaces.

Figure 10:
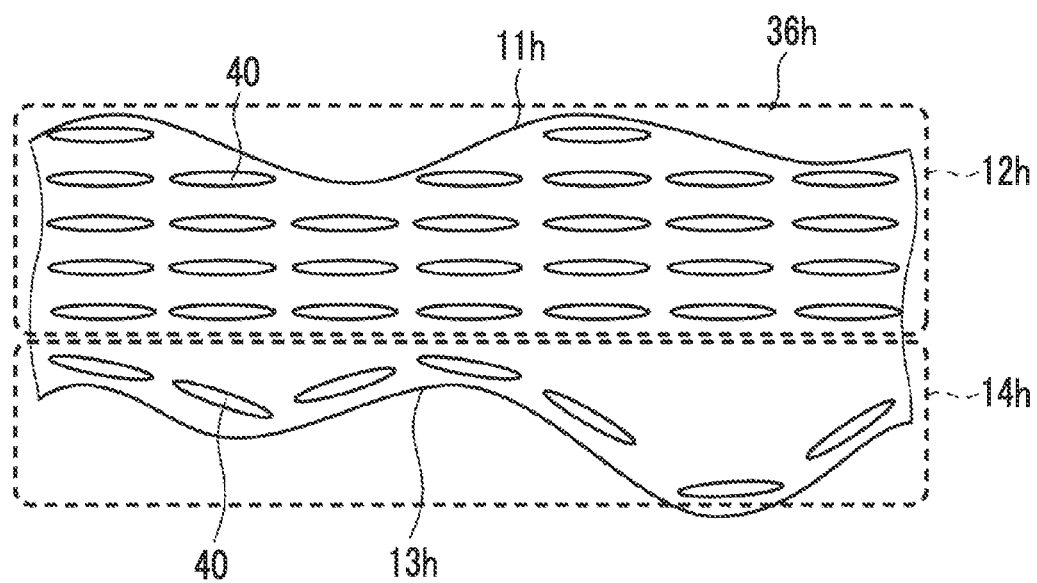
FIG. 10 is a diagram conceptually showing another example of the liquid crystal layer.

FIG. 10 is a diagram conceptually showing another example of the liquid crystal layer.

In a liquid crystal layer 36h shown in FIG. 10, a first main surface 11h is a non-flat surface having a concave-convex shape, and a second main surface 13h is a non-flat surface having a concave-convex shape.

Even in the liquid crystal layer 36h, the liquid crystal compounds 40 present in the second region 14h on the second main surface 13h side have the equal angle (alignment angle) of the slow axes with respect to the non-flat surface. In the shown example, the alignment angle is 0°. On the other hand, the slow axes of the liquid crystal compound 40 present in the first region 12h on the first main surface 11h side are parallel to the reference plane (left-right direction in the shown example) and parallel to each other.

As described above, both main surfaces of the liquid crystal layer may be non-flat surfaces.

In the example shown in FIG. 10, the first main surface 11h and the second main surface 13h each have an irregular concave-convex shape, but the present invention is not limited thereto, and the first main surface and the second main surface may be any of the non-flat surfaces shown in FIG. 5 and FIGS. 7 to 9, respectively. In addition, the shape of the non-flat surface of the first main surface and the shape of the non-flat surface of the second main surface may be the same or different from each other.

Here, the examples shown in FIG. 2 and the like have a configuration in which, in a case where the first main surface which is a flat surface is defined as a reference plane, the slow axis of the liquid crystal compound present in the first region is parallel to the reference plane, but the present invention is not limited thereto.

For example, as shown in FIG. 8 and FIG. 9 respectively, the present invention may have a configuration in which, in a case where the non-flat surface (second main surface) of the liquid crystal layer has a shape having an optical axis $W_1$, such as a lens shape, a plane perpendicular to the optical axis $W_1$ is defined as a reference plane, and the slow axis of the liquid crystal compound present in the first region is parallel to the reference plane.

In the example shown in FIG. 8 and FIG. 9 respectively, the plane of the non-flat surface of the liquid crystal layer perpendicular to the optical axis $W_1$ and the flat surface (first main surface) of the liquid crystal layer are parallel to each other.

In addition, for example, as shown in FIG. 8 and FIG. 9 respectively, the present invention may have a configuration in which, in a case where the main surface of the support has a shape having an optical axis $W_2$, such as a lens shape, a plane perpendicular to the optical axis $W_2$ is defined as a reference plane, and the slow axis of the liquid crystal compound present in the first region is parallel to the reference plane. The support having the optical axis $W_2$ is an optical member in the present invention.

In the example shown in FIG. 8 and FIG. 9 respectively, the plane of the main surface of the support perpendicular to the optical axis $W_2$ and the flat surface (first main surface) of the liquid crystal layer are parallel to each other.

In addition, the optical member may be a light source.

Figure 11:
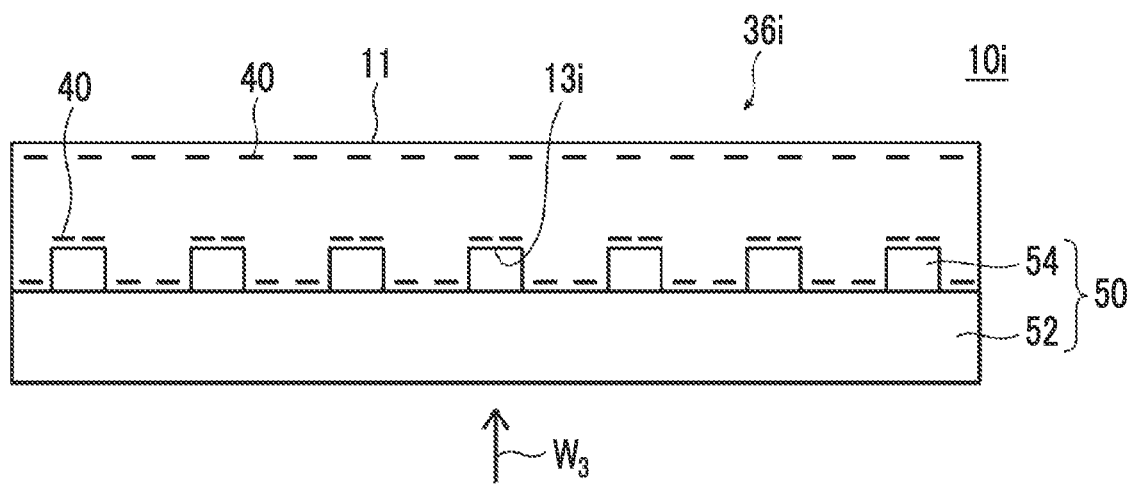
FIG. 11 is a diagram conceptually showing another example of the liquid crystal member.

FIG. 11 is a diagram conceptually showing another example of the liquid crystal member.

A liquid crystal member 10i shown in FIG. 11 has a light source 50 which has a light emitting diode (LED) substrate 52 and a plurality of LEDs 54 arranged at predetermined intervals on the LED substrate 52; and a liquid crystal layer 36i laminated on a surface of the light source 50, on which the LEDs 54 are disposed.

As shown in FIG. 11, in the light source 50, since the plurality of LEDs 54 are disposed at predetermined intervals, the surface of the light source 50 has a concave-convex shape. Therefore, a second main surface 13i of the liquid crystal layer 36i disposed on the light source 50, on the light source 50 side, is a non-flat surface having a concave-convex shape along the concave-convex shape of the surface of the light source 50. In addition, a first main surface 11 of the liquid crystal layer 36i on the side opposite to the light source 50 is a flat surface.

Even in the liquid crystal layer 36i, the liquid crystal compounds 40 present in the second region on the second main surface 13i side have the equal angle (alignment angle) of the slow axes with respect to the non-flat surface. In the shown example, the alignment angle is 0°. On the other hand, the slow axes of the liquid crystal compound 40 present in the first region on the first main surface 11 side are parallel to the first main surface 11 and parallel to each other.

Such a liquid crystal member 10i may have a configuration in which, in a case where a traveling direction of light emitted from the light source 50 is an optical axis $W_3$ of the light source 50, a plane perpendicular to the optical axis $W_3$ is defined as a reference plane, and the slow axis of the liquid crystal compound present in the first region is parallel to the reference plane.

In the example shown in FIG. 11, the plane of the light source 50 perpendicular to the optical axis $W_3$ and the flat surface (first main surface 11i) of the liquid crystal layer 36i are parallel to each other.

Figure 12:
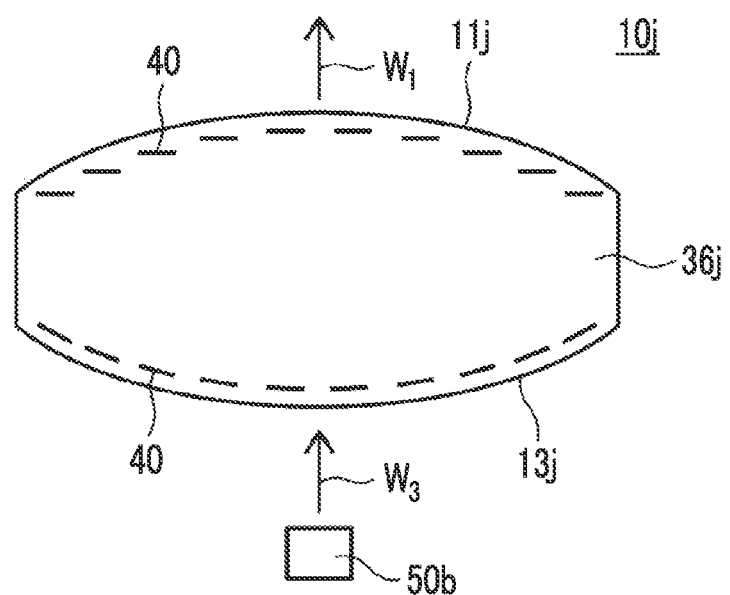
FIG. 12 is a diagram conceptually showing another example of the liquid crystal member.

FIG. 12 is a diagram conceptually showing another example of the liquid crystal member.

A liquid crystal member 10j shown in FIG. 12 has a light source 50b and a liquid crystal layer 36j disposed on a side where light of the light source 50 is emitted.

The light source 50b is a light source which emits light having directivity, such as LED.

In the liquid crystal layer 36j, a second main surface 13j on the light source 50b side and a first main surface 11j on a side opposite to the light source 50b are non-flat surfaces having a convex shape. That is, the liquid crystal layer 36j has a convex lens shape.

In addition, even in the liquid crystal layer 36j as shown in FIG. 12, the liquid crystal compounds 40 present in the second region on the second main surface 13j side have the equal angle (alignment angle) of the slow axes with respect to the non-flat surface. In the shown example, the alignment angle is 0°. On the other hand, the slow axes of the liquid crystal compound 40 present in the first region on the first main surface 11j side are parallel to each other.

Such a liquid crystal member 10j may have a configuration in which, in a case where a traveling direction of light emitted from the light source 50b is an optical axis $W_3$ of the light source 50b, a plane perpendicular to the optical axis $W_3$ is defined as a reference plane, and the slow axis of the liquid crystal compound present in the first region is parallel to the reference plane.

In addition, the example shown in FIG. 12 can also have a configuration in which, in a case where the non-flat surfaces (first main surface and second main surface) of the liquid crystal layer 36j have a lens shape, a plane perpendicular to an optical axis $W_1$ is defined as a reference plane, and the slow axis of the liquid crystal compound 40 present in the first region is parallel to the reference plane.

A thickness of the liquid crystal layer may be appropriately set according to the shape of the liquid crystal layer (non-flat surface), desired optical characteristics of the liquid crystal layer, restrictions on the shape on the substrate side, and the like. From the viewpoint of forming a non-flat surface on at least one main surface of the liquid crystal layer, the thickness of the liquid crystal layer is preferably 10 μm or more, more preferably 10 μm to 1000 μm, and still more preferably 250 μm to 1000 μm.

<Support>

The support 30 supports the liquid crystal layer.

As the support 30, various sheet-like materials (film-like or plate-like materials) can be used as long as the support can support the liquid crystal layer.

In addition, the support 30 has, in one main surface, a concave-convex shape corresponding to the concave-convex shape formed in the main surface of the liquid crystal layer, which is a non-flat surface. The concave-convex shape of the support 30 may be formed by a known method depending on a material for forming the support 30, a type of the concave-convex shape, and the like.

As the material of the support 30, a material which is used as a support in a liquid crystal member in the related art having a liquid crystal layer, such as glass, triacetyl cellulose (TAC), polyethylene terephthalate (PET), polycarbonate, polyvinyl chloride, acrylic, and polyolefin, can be appropriately used.

In addition, as the support 30, an optical component such as a concave lens, a convex lens, a Fresnel lens sheet, a light guide plate, and a prism sheet may be used.

A thickness of the support 30 is not limited, and a thickness which can hold the liquid crystal layer may be appropriately set according to the use of the liquid crystal member, the material for forming the support 30, and the like.

The thickness of the support 30 is preferably 1 to 1000 μm, more preferably 3 to 250 m, and still more preferably 5 to 150 μm.

In addition, in the liquid crystal member according to the embodiment of the present invention, the support 30 may be finally peeled off from the liquid crystal layer, and the liquid crystal layer may be used alone.

<Liquid Crystal Layer>

As described above, the liquid crystal layer is a liquid crystal layer formed by fixing a liquid crystal phase in which the liquid crystal compound 40 having a polymerizable group are aligned, and the slow axes of the liquid crystal compound are parallel to each other in the first region on the first main surface side, and the alignment angles of the slow axes of the liquid crystal compounds are equal to each other in the second region on the second main surface side.

<<Method for Forming Liquid Crystal Layer>>

The liquid crystal layer can be formed by fixing, in a layered manner, a liquid crystal phase in which an orientation of a slow axis of the liquid crystal compound is in a predetermined alignment state.

A structure in which the liquid crystal phase is fixed may be any structure as long as the alignment of the liquid crystal compound in the liquid crystal phase is maintained, and typically, the structure is preferably a structure in which a polymerizable liquid crystal compound is brought into a predetermined alignment state and is polymerized and cured by ultraviolet irradiation, heating, and the like to form a layer without fluidity, and simultaneously, the layer changes to a state that an external field or an external force does not cause a change in alignment.

In the structure in which the liquid crystal phase is fixed, it is sufficient that optical properties of the liquid crystal phase are maintained, and it is not necessary that the liquid crystal compound exhibits liquid crystal property in the liquid crystal layer. For example, the polymerizable liquid crystal compound may lose its liquid crystal property by increasing its molecular weight by a curing reaction.

Here, in the present invention, a liquid crystal compound having magnetic susceptibility anisotropy is used as the liquid crystal compound, and the liquid crystal compound is aligned by applying a magnetic field to the liquid crystal layer, by an alignment film, or the like. Accordingly, in the region on the second main surface side, which is the non-flat surface of the liquid crystal layer, the liquid crystal compound can be aligned by an alignment restriction force of the alignment film so that the angle of the slow axis with respect to the non-flat surface is a predetermined angle, and in the region on the first main surface side, the slow axes of the liquid crystal compound can be aligned in parallel with each other.

Specifically, first, a surface (concave-convex surface) of a support having a concave-convex shape, on which the liquid crystal layer is formed, is subjected to an alignment treatment. With regard to the alignment treatment, an alignment film may be formed on the support, or the surface of the support may be subjected to the alignment treatment. Examples of the alignment treatment applied to the support include a rubbing treatment and a method of processing with laser light.

As the alignment film, various known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, a material for forming polyimide, polyvinyl alcohol, a polymer having a polymerizable group described in JP1997-152509A (JP-H9-152509A), or an alignment film 32 and the like described in JP2005-97377A, JP2005-99228A, and JP2005-128503A is preferable.

As the alignment film, a so-called photo-alignment film obtained by irradiating a photo-alignable material with polarized light or non-polarized light can also be used. The irradiation of polarized light can be performed in a direction perpendicular or oblique to the photo-alignment film, and the irradiation of non-polarized light can be performed in a direction oblique to the photo-alignment film.

A thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method for forming the alignment film is not limited, and various known methods can be used depending on the material for forming the alignment film. Examples thereof include a method including: applying the alignment film to a surface of the support; drying the applied alignment film; and exposing the alignment film to laser light to form an alignment pattern.

Next, a liquid crystal composition which contains a liquid crystal compound having a polymerizable group and a polymerization initiator is applied onto the surface of the support, which has been subjected to the alignment treatment (on which the alignment film has been formed), to form a coating film. In a case where a liquid crystal layer in which both main surfaces are non-flat surfaces is formed, the non-flat surfaces may be formed on both main surfaces of the liquid crystal layer by, after applying the liquid crystal composition onto the support having a concave-convex shape, sandwiching the coating film with a second support having a concave-convex shape.

For the application of the liquid crystal composition, any known method capable of uniformly applying a liquid onto a sheet-like material, such as printing methods such as ink jet and scroll printing, spin coating, bar coating, and spray coating, can be used.

The applied liquid crystal composition may be dried and/or heated as necessary.

Next, a step of alignment in magnetic field is performed for aligning the liquid crystal compound in the coating film formed on the alignment film into a desired alignment state, in which the liquid crystal compound is desired to be immobilized. At this time, in the liquid crystal compound having the magnetic susceptibility anisotropy, a direction in which magnetic susceptibility is high is arranged along a direction of magnetic lines of force. Therefore, the direction of the slow axis of the liquid crystal compound in the coating film can be controlled by the direction of the magnetic lines of force. In this case, the liquid crystal compound present in the region in the vicinity of the alignment film (the surface of the support subjected to the alignment treatment) is controlled by the alignment restriction force due to the alignment film more dominantly than that due to the magnetic field. On the other hand, in the region distant from the alignment film, the alignment restriction force due to the magnetic field is dominant. Therefore, in the portion which is to be the second region on the non-flat surface side, by the alignment restriction force of the alignment film formed on the concave-convex surface of the support, the slow axes of the liquid crystal compound are aligned so that the angles with respect to the adjacent non-flat surface are equal to each other, and in the other portion which is to be the first region, by the alignment restriction force due to the magnetic field, the slow axis of the liquid crystal compound is aligned in a desired direction.

In addition, in a case where the magnetic lines of force acting on the coating film are parallel to each other, the slow axis of the liquid crystal compound can be aligned in a desired direction in the entire region of the first region in the liquid crystal layer.

It is sufficient that the magnetic field is generated by using a pair of magnets, and various known electromagnet devices and the like can be used. By arranging a pair of magnets so as to sandwich the coating film and generating a magnetic field according to the orientation in which the slow axis of the liquid crystal compound is desired to be aligned, the magnetic field is applied to the coating film to align the slow axis of the liquid crystal compound in an arbitrary direction. In order to generate a magnetic field having a strong intensity, it is preferable to use an electromagnet or a superconducting magnet.

Here, as described above, in the case of forming the liquid crystal layer having a concave-convex shape, the liquid crystal compound present in the region distant from the concave-convex shape is also affected by the concave-convex shape due to the interaction with the adjacent liquid crystal compound. On the other hand, in the alignment in magnetic field, by applying an alignment restriction force sufficient to cancel the interaction acting on the liquid crystal compound present in the region (first region) distant from the concave-convex shape, the slow axis of the liquid crystal compound can be aligned in parallel in the region (first region) distant from the concave-convex shape. Meanwhile, in a case where the alignment restriction force of the alignment in magnetic field is too strong, the alignment of the liquid crystal compound in the second region in the vicinity of the non-flat surface having a concave-convex shape may be disturbed. From the above-described points, the magnetic field intensity during the alignment in magnetic field is preferably 0.1 tesla (T) to 2.0 T, more preferably 0.2 T to 1.0 T, and still more preferably 0.4 T to 0.8 T.

In addition, in the step of alignment in magnetic field, in order to promote the alignment of the liquid crystal compound, it is preferable to heat the coating film to raise the temperature of the coating film, and it is more preferable to set the temperature of the coating film to a transition temperature of isotropic phase-nematic transition point of the liquid crystal or higher.

Next, the coating film is irradiated with light to be photopolymerized while maintaining the magnetic field intensity and the temperature. It is preferable to use ultraviolet rays for the light irradiation. An irradiation energy is preferably 20 mJ/cm$^2$ to 50 J/cm$^2$, and more preferably 50 mJ/cm$^2$ to 1500 mJ/cm$^2$. In order to promote the photopolymerization reaction, the light irradiation may be carried out under heating conditions or under a nitrogen atmosphere. A wavelength of the ultraviolet rays to be irradiated is preferably 250 nm to 430 nm.

Through the above-described steps, it is possible to form a liquid crystal layer in which at least one main surface is a non-flat surface, the angles of the slow axes of the liquid crystal compound with respect to the adjacent non-flat surface are equal to each other in the second region on the non-flat surface side, and the slow axes of the liquid crystal compound are parallel to each other in the first region on the other main surface side.

Here, in the liquid crystal member according to the embodiment of the present invention, in order to form the non-flat surface on at least one main surface of the liquid crystal layer, it is required that the liquid crystal layer has a thickness on the order of mm or cm. Therefore, even in a case where the liquid crystal layer is to be thick, it is required to control the alignment state of the liquid crystal compound in the thickness direction.

Here, in many cases of the formation of the liquid crystal layer, the alignment restriction force is applied two-dimensionally by an alignment film, such as rubbing and photo alignment. However, the thickness in which the alignment can be regulated by the alignment film is at most approximately 10 μm, and in a case where the thickness exceeds 10 μm, desired optical characteristics may not be obtained due to fluctuations in the alignment angle or alignment defects.

On the other hand, it is known that, by using an electric field or a magnetic field, the alignment of the liquid crystal compound can be three-dimensionally controlled in a contactless manner and without being restricted by the thickness. In this case, the physical properties required to the liquid crystal compound are dielectric constant anisotropy for an electric field and magnetic susceptibility anisotropy for a magnetic field. Among these, in a case of using an electric field, there are restrictions such as the placement of electrodes and the generation of a stable electric field, but in a case of using a magnetic field, the liquid layer compound can be aligned in any direction depending on the placement of permanent magnets or electromagnets.

Therefore, in the present invention, by aligning the liquid crystal compound by the alignment in magnetic field, even in a case where the thickness of the liquid crystal layer is 10 m or more, it is possible to obtain a liquid crystal layer in which the direction of the slow axis of the liquid crystal compound is uniform (parallel) in the entire region of the first region other than the second region in the vicinity of the alignment film.

<<Liquid Crystal Composition>>

The liquid crystal composition for forming the liquid crystal layer contains a liquid crystal compound having a polymerizable group and a polymerization initiator. In addition, a crosslinking agent, a surfactant, a polymerization inhibitor, an antioxidant, an ultraviolet absorber, a light stabilizer, a coloring material, metal oxide fine particles, or the like may be added to the liquid crystal composition as long as the optical performance and the like are not deteriorated.

(Polymerizable Liquid Crystal Compound)

As the liquid crystal compound having a polymerizable group, a rod-like liquid crystal compound or a disk-like liquid crystal compound can be used.

——Rod-Like Liquid Crystal Compound——

Examples of the rod-like liquid crystal compound having a polymerizable group include a rod-like nematic liquid crystal compound. As the rod-like nematic liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, alkenylcyclohexylbenzonitriles, and the like are preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable and an ethylenically unsaturated polymerizable group is more preferable. The polymerizable group can be introduced into the molecule of the liquid crystal compound by various methods. The number of polymerizable groups included in the polymerizable liquid crystal compound is preferably 1 to 6 and more preferably 1 to 3.

Examples of the polymerizable liquid crystal compound include compounds described in "Makromol. Chem., vol. 190, p. 2255 (1989), Advanced Materials, vol. 5, p. 107 (1993)", U.S. Pat. Nos. 4,683,327A, 5,622,648A, 5,770,107A, WO1995/22586A, WO1995/24455A, WO1997/00600A, WO1998/23580A, WO1998/52905A, JP1989-272551A (JP-H1-272551A), JP1994-16616A (JP-H6-16616A), JP1995-110469A (JP-H7-110469A), JP1999-80081A (JP-H11-80081A), JP2001-328973A, and the like. Two or more kinds of polymerizable liquid crystal compounds may be used in combination. In a case of using two or more kinds of polymerizable liquid crystal compounds in combination, the alignment temperature can be lowered.

In addition, as a polymerizable liquid crystal compound other than the above, a cyclic organopolysiloxane compound having a cholesteric phase, as described in JP1982-165480A (JP-S57-165480A), or the like can be used. Furthermore, as the above-described high-molecular-weight liquid crystal compound, a polymer in which a mesogen group exhibiting liquid crystal are introduced into the main chain, the side chain, or both main chain and side chain, a polymeric cholesteric liquid crystal in which a cholesteryl group is introduced into the side chain, a liquid crystalline polymer as described in JP1997-133810A (JP-H9-133810A), a liquid crystalline polymer as described in JP1999-293252A (JP-H11-293252A), and the like can be used.

In addition, an amount of the polymerizable liquid crystal compound added to the liquid crystal composition is preferably 75% to 99.9% by mass, more preferably 80% to 99% by mass, and still more preferably 85% to 90% by mass with respect to the mass of solid content of the liquid crystal composition (mass excluding a solvent).

——Disk-Like Liquid Crystal Compound——

As the disk-like liquid crystal compound, for example, compounds described in JP2007-108732A and JP2010-244038A can be preferably used.

Examples thereof include the following compounds.

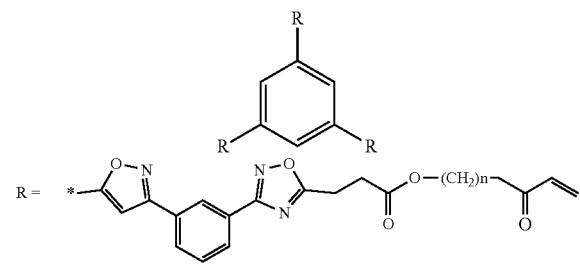

(Polymerization Initiator)

As the polymerization initiator, a photopolymerization initiator or a thermal polymerization initiator can be used.

In an aspect in which the polymerization reaction proceeds by ultraviolet irradiation, the polymerization initiator to be used is preferably a photopolymerization initiator capable of initiating a polymerization reaction by irradiation with ultraviolet rays.

Examples of the photopolymerization initiator include α-carbonyl compounds (described in U.S. Pat. Nos. 2,367,661A and 2,367,670A), acyloin ether (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine compounds and phenazine compounds (described in JP1985-105667A (JP-S60-105667A) and U.S. Pat. No. 4,239,850A), and oxadiazole compounds (described in U.S. Pat. No. 4,212,970A).

A content of the photopolymerization initiator in the liquid crystal composition is preferably 0.1% to 20% by mass, and more preferably 0.5% to 12% by mass with respect to the content of the liquid crystal compound.

(Crosslinking Agent)

The liquid crystal composition may optionally contain a crosslinking agent in order to improve film hardness and durability after curing. As the crosslinking agent, a crosslinking agent which cures the liquid crystal composition with ultraviolet rays, heat, humidity, and the like can be suitably used.

The crosslinking agent is not particularly limited and can be appropriately selected according to the purpose, and examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino); isocyanate compounds such as hexamethylene diisocyanate and biuret-type isocyanate; polyoxazoline compounds having an oxazoline group in the side chain; and alkoxysilane compounds such as vinyltrimethoxysilane and N-(2-aminoethyl) 3-aminopropyltrimethoxysilane. In addition, a known catalyst can be used depending on reactivity of the crosslinking agent, and in addition to improving the film hardness and durability, productivity can be improved. These may be used alone or in combination of two or more kinds thereof.

A content of the crosslinking agent is preferably 3% to 20% by mass, and more preferably 5% to 15% by mass with respect to the mass of solid content of the liquid crystal composition. In a case where the content of the crosslinking agent is within the above-described range, an effect of improving crosslinking density can be easily obtained, and stability of the liquid crystal phase is further improved.

(Surfactant)

The liquid crystal composition used in forming the liquid crystal layer may contain a surfactant.

The surfactant is preferably a compound which can function as an alignment control agent contributing to the alignment of the liquid crystal compound in a stable or rapid manner. Examples of the surfactant include a silicone-based surfactant and a fluorine-based surfactant, and preferred examples thereof include a fluorine-based surfactant.

Specific examples of the surfactant include compounds described in paragraphs [0082] to [0090] of JP2014-119605A, compounds described in paragraphs [0031] to [0034] of JP2012-203237A, compounds exemplified in paragraphs [0092] and [0093] of JP2005-99248A, compounds exemplified in paragraphs [0076] to [0078] and paragraphs [0082] to [0085] of JP2002-129162A, and fluorine (meth)acrylate polymers described in paragraphs [0018] to [0043] and the like of JP2007-272185A.

The surfactant may be used alone or in combination of two or more kinds thereof.

As the fluorine-based surfactant, the compounds described in paragraphs [0082] to [0090] of JP2014-119605A are preferable.

An amount of the surfactant added to the liquid crystal composition is preferably 0.01% to 10% by mass, more preferably 0.01% to 5% by mass, and still more preferably 0.02% to 1% by mass with respect to the total mass of the liquid crystal compound.

The liquid crystal composition is preferably used as a liquid in forming the liquid crystal layer.

The liquid crystal composition may contain a solvent. The solvent is not limited and can be appropriately selected according to the purpose, but an organic solvent is preferable.

The organic solvent is not limited and may be appropriately selected according to the purpose, and examples thereof include ketones, alkyl halides, amides, sulfoxides, heterocyclic compounds, hydrocarbons, esters, and ethers. These may be used alone or in combination of two or more kinds thereof. Among these, in consideration of environmental load, ketones are preferable.

[Use of Liquid Crystal Member]

Hereinafter, uses of the liquid crystal member will be exemplified.

In a case where the liquid crystal member is used for a millimeter-wave modulation element, it is assumed that the second main surface of the liquid crystal layer has a concave-convex shape along a non-planar shape on a sensor side (for example, has a shape such as the examples shown in FIG. 5 and FIG. 7). The millimeter-wave modulation element is, for example, an element in which, by placing the element in front of multiple millimeter wave sources and controlling their phases individually, a function (beam forming and beam steering) of controlling the traveling direction of the millimeter wave as a plane wave is exhibited.

In such a case of using as a millimeter-wave modulation element, in a case where the direction of the slow axis of the liquid crystal compound is non-uniform in the layer, due to scattering, absorption, refraction, and the like, the phase cannot be controlled as intended, and the function as the millimeter-wave modulation element is deteriorated.

On the other hand, in the liquid crystal member according to the embodiment of the present invention, since, in the liquid crystal layer, the alignment angles of the liquid crystal compound are equal to each other in the region on the non-flat surface side and the slow axes of the liquid crystal compound are parallel to each other in the region on the other main surface side, while maintaining the function as a retardation layer, it is possible to prevent the occurrence of scattering, absorption, refraction, and the like at the interface on the non-flat surface, and to properly exhibit the function as the millimeter-wave modulation element.

In addition, the liquid crystal member according to the embodiment of the present invention can be used for uses such as a lens array for diffusing light emitted from a point light source and focal point switching, in head-mounted displays and wearable displays used in applications such as virtual reality (VR) and augmented reality (AR).

Hereinbefore, the liquid crystal member according to the embodiment of the present invention has been described in detail, but the present invention is not limited to the above-described examples and various improvements and changes can be made without departing from the spirit of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Therefore, the scope of the present invention should not be construed as being limited to the following specific examples.

Example 1

<Production of Liquid Crystal Member>
(Preparation of Liquid Crystal Composition)
The following oxime ester compound-based photopolymerization initiator (Irgacure OXE01, manufactured by BASF) was added to the following polymerizable liquid crystal monomer 1 (NLO-2224) in an amount of 0.01% by weight with respect to the weight ratio of the liquid crystal monomer, the mixture was dissolved in methyl ethyl ketone to prepare a solution having a concentration of solid contents of 36 vol %, thereby preparing a liquid crystal composition. The polymerizable liquid crystal monomer 1 is a liquid crystal compound having a magnetic susceptibility anisotropy $|\Delta X|$ of $1 \times 10^{-8}$. The magnetic susceptibility anisotropy was measured by the above-described method.

Polymerizable Liquid Crystal Monomer 1

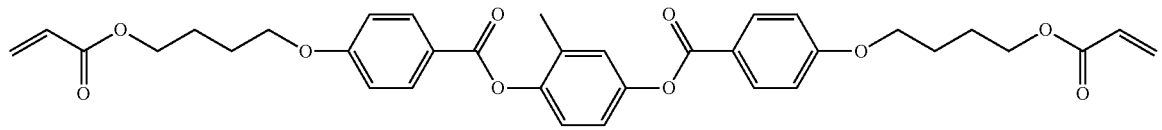 [SMILES: C=CC(=O)OCCCCOc1ccc(C(=O)Oc2ccc(OC(=O)c3ccc(OCCCCOC(=O)C=C)cc3)c(C)c2)cc1]

Photopolymerization Initiator

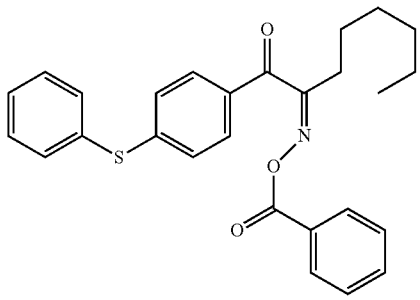 [SMILES: CCCCCC/C(=N/OC(=O)c1ccccc1)C(=O)c1ccc(Sc2ccccc2)cc1]

Figure 13:
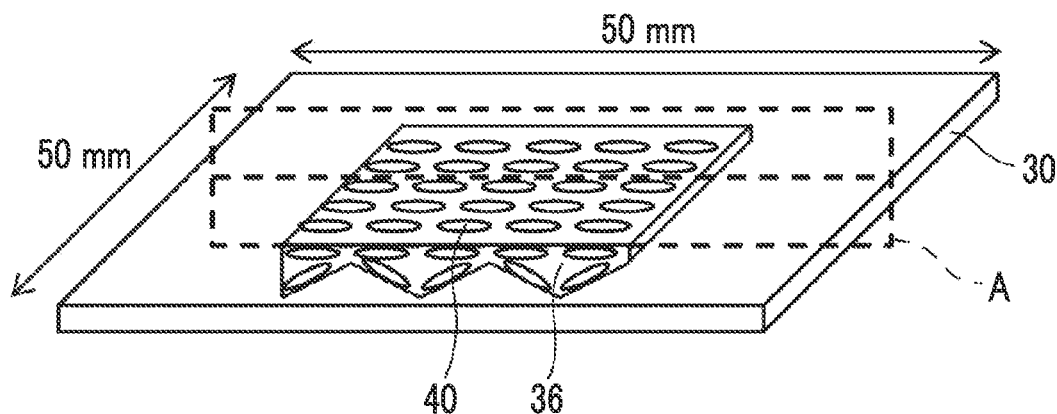
FIG. 13 is a diagram illustrating a liquid crystal member in Examples.

(Formation of Alignment Film)
Next, as a support, a blue plate glass base material in which a microprism-shaped concave portion having an isotropic triangular cross section was formed at a center of a square having a side of 50 mm as shown in FIG. 13 was prepared. A depth of the concave portion was set to be 7 mm to 8 mm, a width in the arrangement direction of one surface of the microprism was set to be 5 mm, and a length in the extension direction was set to be 25 mm.

A polyvinyl alcohol (PVA) alignment film was applied to the surface of the above-described blue plate glass base material, on which the concave portion was formed, so as to have a film thickness of 1 μm, and the alignment film was subjected to a rubbing treatment. A direction of the rubbing treatment was the arrangement direction of the microprism.

(Formation of Liquid Crystal Layer)
Next, the above-described liquid crystal composition was applied onto the alignment film by a spin coating method, and left at 80° C. for 2 μminutes to dry the solvent. The coating and drying were repeated until the concave portions were filled with the solid content to form a coating film. In this case, among two main surfaces of the coating film, a main surface on the air interface side was a first main surface of the liquid crystal layer, and a main surface on the support side was a second main surface of the liquid crystal layer.

Subsequently, while maintaining the temperature of the support and the coating film at 100° C. (temperature exceeding the transition point of the liquid crystal), using an electromagnet device (manufactured by TOEI INDUSTRY CO., LTD.), a magnetic field of 1.0 tesla (T) was applied for 1 μminute in a direction parallel to the first main surface and parallel to the arrangement direction of the microprism for alignment. Subsequently, while maintaining the temperature and the magnetic field intensity, using an ultraviolet irradiator (long arc type high pressure mercury lamp, manufactured by EYE GRAPHICS Co., Ltd.), polymerization was performed by irradiating the coating film with an illuminance of 10 mW/cm$^2$ and an integrating accumulate irradiation amount of 1000 mJ/cm$^2$ (365 nm), and the alignment state was fixed to form a liquid crystal layer.

Figure 14:
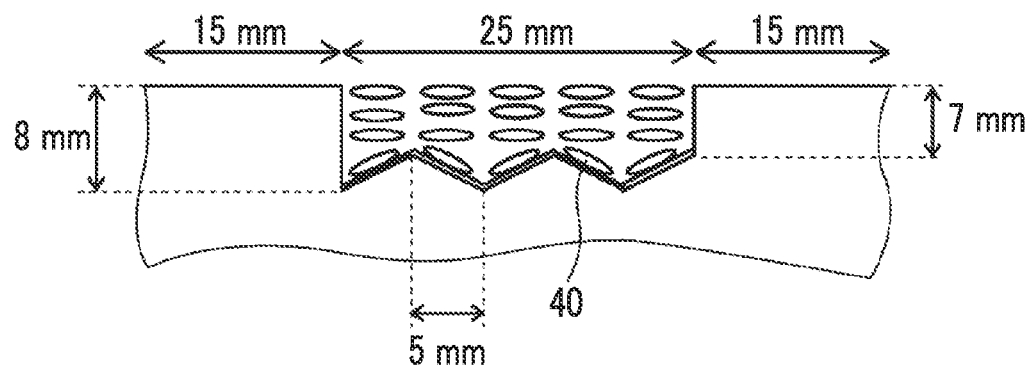
FIG. 14 is a diagram illustrating a liquid crystal member in Examples.

As a result, a liquid crystal member having a support and a liquid crystal layer, as shown in FIGS. 13 and 14, was produced. FIG. 14 is a cross-sectional view taken along a broken line A of FIG. 13.

Example 2

A liquid crystal member was produced in the same manner as in Example 1, except that the angle formed by the direction of applying the magnetic field with respect to the first main surface was 45°.

Comparative Example 1

A liquid crystal member was produced in the same manner as in Example 1, except that, as the liquid crystal compound, a liquid crystal compound (the following polymerizable liquid crystal monomer 2) which did not exhibit magnetic susceptibility anisotropy, in which the magnetic susceptibility anisotropy $|\Delta X|$ was $1 \times 10^{-10}$, was used.
Polymerizable Liquid Crystal Monomer 2

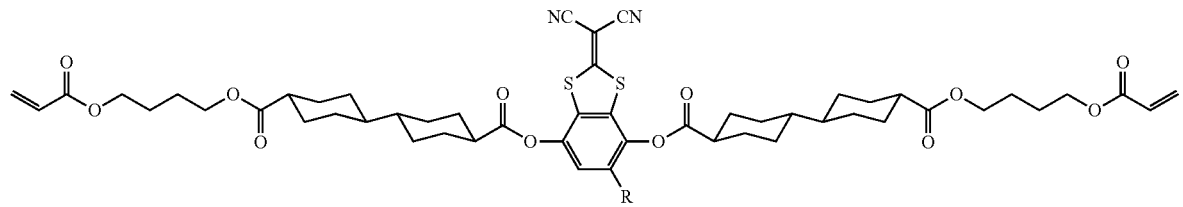

Comparative Example 2

A liquid crystal member was produced in the same manner as in Example 1, except that the support was coated with the liquid crystal composition, and then the liquid crystal composition was polymerized by irradiation with ultraviolet rays without applying a magnetic field.

Comparative Example 3

A liquid crystal member was produced in the same manner as in Example 1, except that the alignment film was not formed.
[Evaluation]
<Alignment State>

Figure 15:
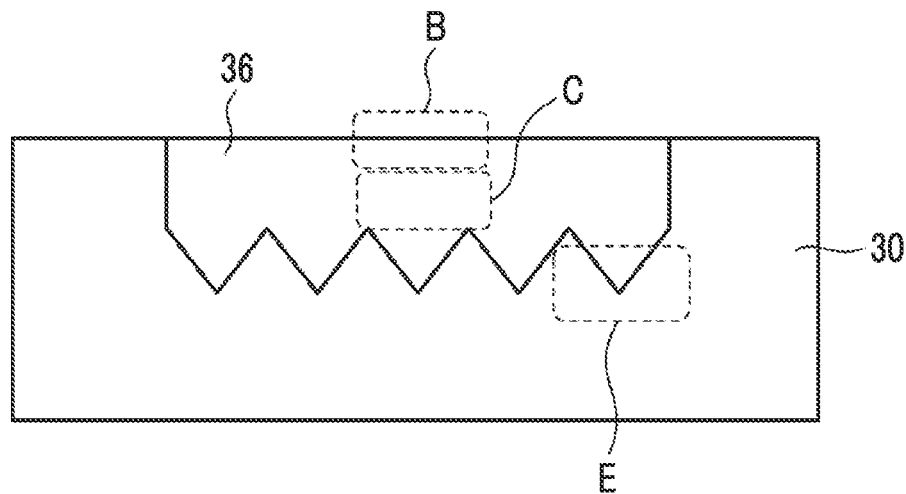
FIG. 15 is a diagram illustrating a method for evaluating an extinction angle in Examples.
Figure 16:
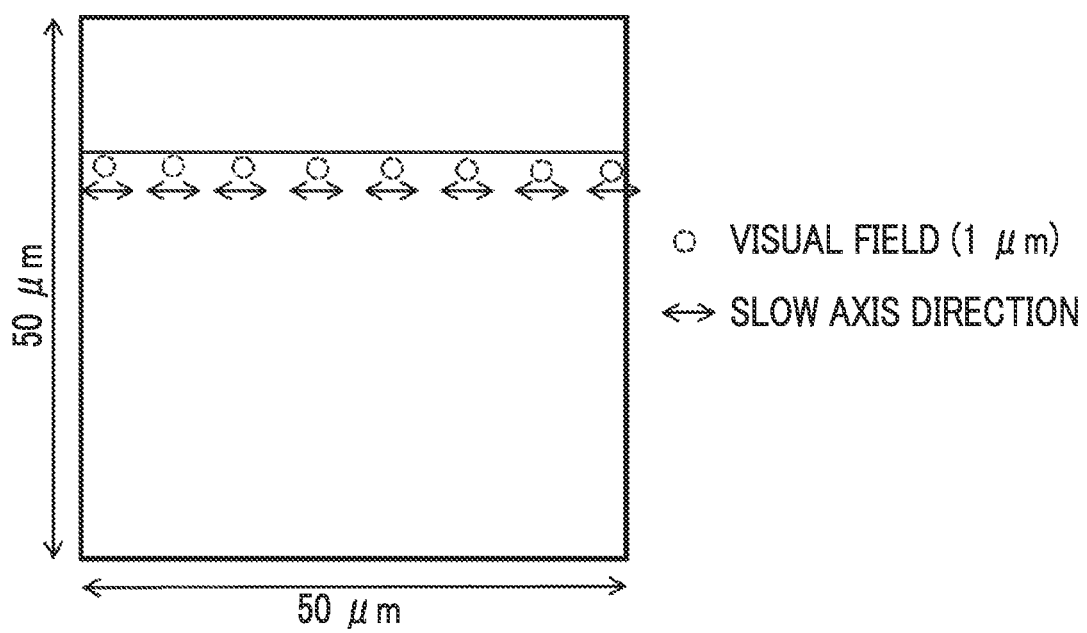
FIG. 16 is a diagram illustrating a method for evaluating an extinction angle in a region B of FIG. 15.
Figure 17:
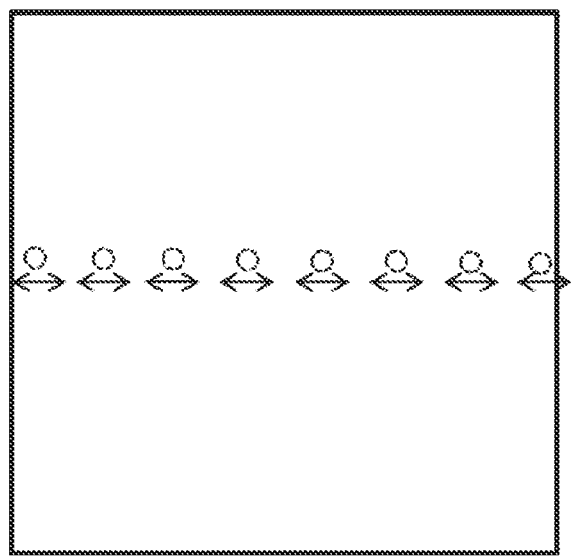
FIG. 17 is a diagram illustrating a method for evaluating an extinction angle in a region C of FIG. 15.
Figure 18:
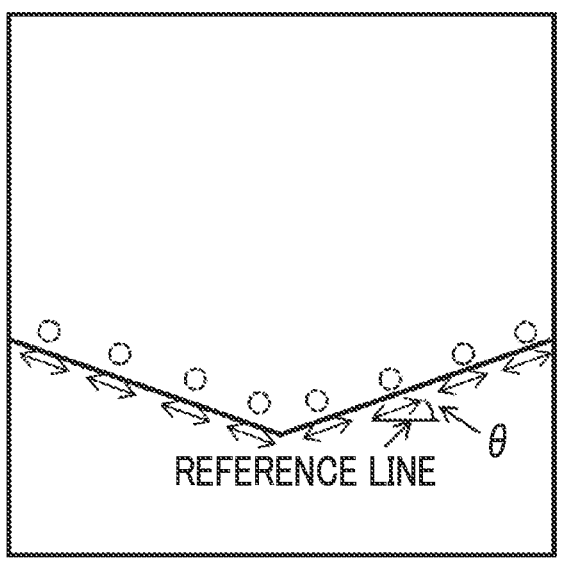
FIG. 18 is a diagram illustrating a method for evaluating an extinction angle in a region E of FIG. 15.
Figure 19:
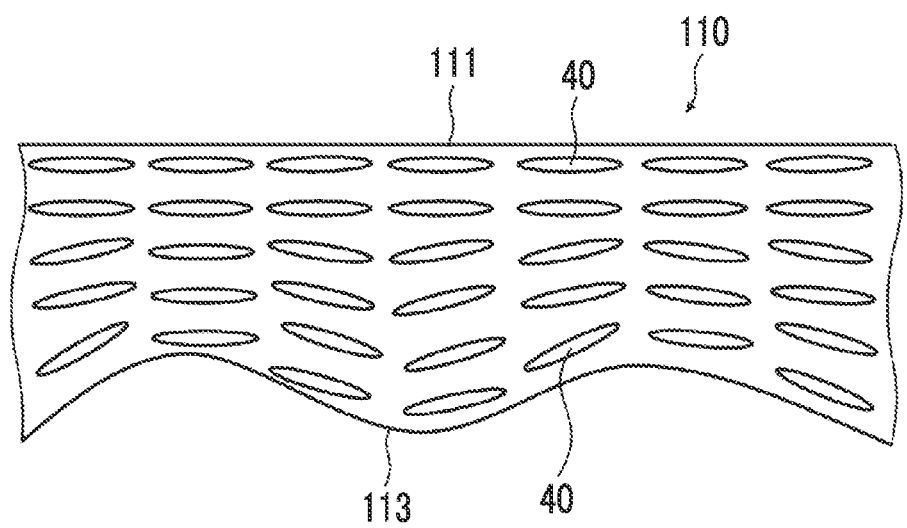
FIG. 19 is a diagram conceptually showing an example of a liquid crystal layer included in a conventional liquid crystal member.

The produced liquid crystal member was observed with a polarization microscope (ECLIPSE LV100 POL manufactured by Nikon Corporation) while being sandwiched between a polarizer and an analyzer disposed in a crossed nicols, and an angle of in-plane slow axes of the liquid crystal layer was determined. Subsequently, a piece of a cross section of the liquid crystal layer was taken along the angle of slow axis and placed on a stage (see FIG. 15), and the magnification was set so that the visual field range was approximately 50 μm. The sample was observed while being rotated, and a stage angle that minimized the amount of transmitted light in a region with a visual field diameter of 1 μm at a position 1 μm from the first main surface in the thickness direction (see FIG. 16), at a position 1 μm from the second main surface in the thickness direction (see FIG. 18), and at eight equally spaced points between the two points (see FIG. 17) was determined as the angle with respect to the first main surface (reference plane). An extinction angle could be determined by this way, but since there were two possibilities that the angle of slow axis was parallel or perpendicular to the extinction angle, a sensitive color plate (530 nm wavelength plate) was inserted into the microscope, and the direction of the slow axis was determined from a relationship between the slow axis of the wavelength plate and the tint. FIG. 16 is an enlarged view of the region shown by B in FIG. 15, FIG. 17 is an enlarged view of the region shown by C in FIG. 15, and FIG. 18 is an enlarged view of the region shown by E in FIG. 15.

Such measurement was performed 10 times at 5 μm intervals in a plane direction of the reference plane.

A region in which a point, that the angles (extinction angles) of the slow axes at a position 1 μm from the first main surface coincided with each other (within 10) in the plane direction and the angle of the slow axis was within 1° with respect to the angle of the slow axis at a position 1 μm from the first main surface, was continuous from the first main surface was determined as the first region.

On the other hand, at a position 1 μm from the second main surface and a point not determined to be the first region, the angle (alignment angle) of the slow axis at each point with respect to the non-flat surface was read at each position in the plane direction, and a case where the alignment angles were equal to each other (within 1°) was determined as the second region.

A case where all of the measurement points were determined to be the first region or the second region was evaluated as A, a case where there was a region which was not determined to be the first region or the second region and had an extinction angle of more than 1° or an alignment angle of more than 1° was evaluated as B, and a case where there was a non-extinction region (extinction angle cannot be determined=no alignment) was evaluated as C.
<Evaluation of Millimeter-Wave Modulation Element>

An absolute value of a phase difference and an in-plane distribution in a case where the produced liquid crystal member was used as a millimeter-wave modulation element were evaluated as follows.

The liquid crystal member was disposed between a millimeter-wave linearly polarized wave transmitter having a wavelength of 3 mm and a receiver, and in-plane mapping of the phase difference between the incident millimeter wave and the received millimeter wave was performed at intervals of 1 mm by moving the liquid crystal member in the arrangement direction of the microprism. With regard to the in-plane distribution of the measured phase difference, a case where (maximum value−minimum value)/(average value) was 2% or less was evaluated as A, and a case of being more than 2% was evaluated as B.

The results are shown in Table 1.

TABLE 1

| | Liquid crystal layer | | | Process | | | | Evaluation |
|---|---|---|---|---|---|---|---|---|
| | Thickness | Shape of non-flat surface | Magnetic susceptibility anisotropy \|ΔX\| | Magnetic field intensity | Applied direction | Alignment film | Alignment state | In-plane distribution of phase difference |
| Example 1 | 7.5 mm | Microprism | $1 \times 10^{-8}$ | 1 T, 1 min | Parallel | Y | A | A |
| Example 2 | 7.5 mm | Microprism | $1 \times 10^{-8}$ | 1 T, 1 min | 45° | Y | A | A |
| Comparative Example 1 | 7.5 mm | Microprism | $1 \times 10^{-10}$ | 1 T, 1 min | Parallel | Y | C | B |
| Comparative Example 2 | 7.5 mm | Microprism | $1 \times 10^{-8}$ | None | — | Y | C | B |
| Comparative Example 3 | 7.5 mm | Microprism | $1 \times 10^{-8}$ | 0.1 T, 1 min | Parallel | N | B | B |

From Table 1, it was found that, in Examples of the present invention, the angles of the slow axes were uniform in the first region and the angles (alignment angles) with respect to the non-flat surface were uniform in the second region, as compared with Comparative Examples. In addition, it was found that the in-plane distribution of the phase difference as the millimeter-wave modulation element was good.

In Comparative Example 1, since the magnetic susceptibility anisotropy of the liquid crystal compound was insufficient, the alignment defects occurred in the region on the first main surface side. In addition, in Comparative Example 2, since the magnetic field was not applied, the alignment defects occurred in the region on the first main surface side. In addition, in Comparative Example 3, since there was no alignment film, the alignment angles of the slow axes were disturbed in the region on the second main surface side.

From the above results, the effect of the present invention is clear.

EXPLANATION OF REFERENCES 10, 10a, 10e, 10i, 10j: liquid crystal member
11, 11h, 11j: first main surface
12: first region
13, 13a to 13j: second main surface
14, 14a, 14f, 14g, 14h: second region
30, 30d, 30e: support
36, 36a to 36j: liquid crystal layer
40: liquid crystal compound
50, 50b: light source
52: LED substrate
54: LED
60: liquid crystal panel
110: conventional liquid crystal member (optical element)
111: first main surface
112: first region
113: second main surface
114: second region
$W_1$, $W_2$, $W_3$: optical axis
A: cross section
B, C, E: region
D: arrangement direction

What is claimed is:

1. A liquid crystal member comprising:
   a liquid crystal layer in which a liquid crystal compound having a polymerizable group is immobilized in an aligned state,
   wherein the liquid crystal compound has magnetic susceptibility anisotropy,
   at least one main surface of two main surfaces of the liquid crystal layer at both ends in a thickness direction is a non-flat surface having any of a concave shape, a convex shape, or a concave-convex shape,
   the non-flat surface includes a tilted surface,
   in a region on the non-flat surface side of one of the two main surfaces, a slow axis of the liquid crystal compound has an equal angle with respect to an adjacent non-flat surface,
   in a region on the other main surface side, slow axes of the liquid crystal compound are parallel to each other, and
   the slow axis of the liquid crystal compound is parallel to a plane including a tilt direction of the tilted surface and a perpendicular line of the tilted surface.

2. The liquid crystal member according to claim 1, wherein a magnetic susceptibility anisotropy ΔX of the liquid crystal compound is $|\Delta X| \geq 1 \times 10^{-8}$.

3. The liquid crystal member according to claim 1, wherein a thickness of the liquid crystal layer is 10 μm or more.

4. The liquid crystal member according to claim 1, wherein the non-flat surface has an optical axis, and
   in a case where a plane perpendicular to the optical axis is defined as a reference plane, the slow axis of the liquid crystal compound present in the region on the other main surface side is parallel to the reference plane.

5. The liquid crystal member according to claim 1, wherein the non-flat surface has a lens shape.

6. The liquid crystal member according to claim 1, further comprising:
   an optical member which is disposed on one main surface side of the liquid crystal layer and has an optical axis,
   wherein, in a case where a plane perpendicular to the optical axis of the optical member is defined as a reference plane, the slow axis of the liquid crystal compound present in the region on the other main surface side is parallel to the reference plane.

7. The liquid crystal member according to claim 6, wherein the optical member is a light source.

8. The liquid crystal member according to claim 1,
wherein the other main surface is a flat surface, and
in a case where the other main surface which is the flat surface is defined as a reference plane, the slow axis of the liquid crystal compound present in the region on the other main surface side is parallel to the reference plane.

9. A millimeter-wave modulation element comprising: the liquid crystal member according to claim 1.

10. The liquid crystal member according to claim 2, wherein a thickness of the liquid crystal layer is 10 μm or more.

11. The liquid crystal member according to claim 2,
wherein the non-flat surface has an optical axis, and
in a case where a plane perpendicular to the optical axis is defined as a reference plane, the slow axis of the liquid crystal compound present in the region on the other main surface side is parallel to the reference plane.

12. The liquid crystal member according to claim 2, wherein the non-flat surface has a lens shape.

13. The liquid crystal member according to claim 2, further comprising:
an optical member which is disposed on one main surface side of the liquid crystal layer and has an optical axis,
wherein, in a case where a plane perpendicular to the optical axis of the optical member is defined as a reference plane, the slow axis of the liquid crystal compound present in the region on the other main surface side is parallel to the reference plane.

14. The liquid crystal member according to claim 13, wherein the optical member is a light source.

15. The liquid crystal member according to claim 2,
wherein the other main surface is a flat surface, and
in a case where the other main surface which is the flat surface is defined as a reference plane, the slow axis of the liquid crystal compound present in the region on the other main surface side is parallel to the reference plane.

16. A millimeter-wave modulation element comprising: the liquid crystal member according to claim 2.

17. The liquid crystal member according to claim 3,
wherein the non-flat surface has an optical axis, and
in a case where a plane perpendicular to the optical axis is defined as a reference plane, the slow axis of the liquid crystal compound present in the region on the other main surface side is parallel to the reference plane.

18. The liquid crystal member according to claim 3, wherein the non-flat surface has a lens shape.

19. The liquid crystal member according to claim 3, further comprising:
an optical member which is disposed on one main surface side of the liquid crystal layer and has an optical axis,
wherein, in a case where a plane perpendicular to the optical axis of the optical member is defined as a reference plane, the slow axis of the liquid crystal compound present in the region on the other main surface side is parallel to the reference plane.

20. The liquid crystal member according to claim 19, wherein the optical member is a light source.

* * * * *